United States Patent
Walton

(10) Patent No.: US 6,808,392 B1
(45) Date of Patent: Oct. 26, 2004

(54) SYSTEM AND METHOD OF DEVELOPING A CURRICULUM FOR STIMULATING COGNITIVE PROCESSING

(76) Inventor: Donna L. Walton, 303 Fountain Gate, Allen, TX (US) 75002

( * ) Notice: Subject to any disclaimer, the term of this patent is extended or adjusted under 35 U.S.C. 154(b) by 0 days.

(21) Appl. No.: 10/306,409

(22) Filed: Nov. 27, 2002

(51) Int. Cl.[7] .............. G09B 19/00; G09B 17/00; G09B 19/02; G09B 3/00; G09B 7/00
(52) U.S. Cl. .............. 434/236; 434/156; 434/178; 434/188; 434/322
(58) Field of Search ............... 434/156, 157, 434/167, 178, 185, 188, 191, 201, 236, 237, 238, 322, 323, 362

(56) References Cited

U.S. PATENT DOCUMENTS

| | | | |
|---|---|---|---|
| 4,060,915 A | 12/1977 | Conway | 35/9 A |
| 4,586,905 A | 5/1986 | Groff | 434/307 |
| 4,593,904 A | 6/1986 | Graves | 273/1 E |
| 4,611,996 A | 9/1986 | Stoner | 434/202 |
| 4,655,713 A | 4/1987 | Weiss | 434/178 |
| 4,671,772 A | 6/1987 | Slade et al. | 434/219 |
| 4,895,518 A | 1/1990 | Arnold et al. | 434/118 |
| 5,035,625 A | 7/1991 | Munson et al. | 434/332 |
| 5,302,132 A * | 4/1994 | Corder | 434/169 |
| 5,303,327 A | 4/1994 | Sturner et al. | 395/2.79 |
| 5,957,699 A | 9/1999 | Peterson et al. | 434/350 |
| 6,052,512 A | 4/2000 | Peterson et al. | 395/200.5 |
| 6,064,856 A | 5/2000 | Lee et al. | 434/350 |
| 6,159,014 A | 12/2000 | Jenkins et al. | 434/169 |
| 6,206,700 B1 | 3/2001 | Brown et al. | 434/116 |
| 6,227,863 B1 | 5/2001 | Spector | 434/167 |
| 6,299,452 B1 | 10/2001 | Wasowicz et al. | 434/178 |
| 6,322,366 B1 | 11/2001 | Bergan et al. | 434/118 |
| 6,331,115 B1 | 12/2001 | Jenkins et al. | 434/169 |
| 6,336,813 B1 * | 1/2002 | Siefert | 434/322 |
| 6,468,084 B1 | 10/2002 | MacMillan | 434/185 |
| 6,523,007 B2 | 2/2003 | Layng et al. | 704/270 |
| 6,544,039 B2 | 4/2003 | Fiedorowicz et al. | 434/167 |
| 6,554,618 B1 | 4/2003 | Lockwood | 434/322 |
| 6,565,359 B2 | 5/2003 | Calhoun et al. | 434/236 |

OTHER PUBLICATIONS

Lightspan Inc., www.lightspan.com, web address, 1997–2004.
Lightspan, How Smart Can a Kid Get?, Brochure–Lightspan Achieve Now, 2003, San Diego, CA.
Lightspan, Reach More Classrooms and More Students, Brochure–Lightspan, San Diego, CA.
Lightspan, Connect Your Standards to Books and Technology, Brochure–Lightspan, San Diego, CA.

* cited by examiner

*Primary Examiner*—John Edmund Rovnak
(74) *Attorney, Agent, or Firm*—Jackson Walker LLP; Robert Klinger; Raffi Gostanion

(57) ABSTRACT

A system and method for developing a curriculum for stimulating cognitive processing. In one embodiment the system includes an objective subsystem configured to obtain at least one goal, objectives and skills for each of the objectives from a user, and a correlation subsystem configured to assign the objectives and the skills to cognitive processing categories (CPCs), and divide the skills into information processing stage classes (IPSCs). The system further includes a sequencing subsystem configured to sequence the skills initially based upon the IPSCs and subsequently upon the CPCs. In one embodiment the method includes placing at least one goal, objectives and skills for each of the objectives into a list, and assigning the objective and the skills to CPCs. The method further includes dividing the skills into IPSCs, and arranging the skills initially based upon the IPSCs and subsequently upon the CPCs.

34 Claims, 15 Drawing Sheets

| Content Area Goal | Operations<br>Students use mathematical operations and relationships among them to understand mathematics. |
|---|---|
| Objectives | 1. Add and subtract whole numbers.<br>2. Know single-digit addition and subtraction facts<br>3. Utilize the commutative and associative properties to develop strategies for selecting the appropriate computational and operational method in problem solving. |
| Skills | Objective 1<br>• put together groups that show fewer objects or more objects than those in a given group<br>• put two simple sets together to produce a new set, the sum of which is less than 19, and identify if the new set is more or less than the original set<br>• remove a specified quantity from a given set to produce a new set, the subtrahend of which is less than 19, and identify if the new set is more or less than the original set<br>• use addition strategies such as doubles, doubles plus one, counting on, and number families to add single digit numbers<br>• apply the concept of zero in addition and subtraction<br>• add and subtract up to two-digit numbers utilizing ' no regrouping' strategy<br>• use addition and subtraction strategies such as doubles, doubles plus or minus one, counting on, counting back and number families to add and subtract single digit numbers<br>• add and subtract up to three-digit numbers utilizing 'no regrouping' strategy.<br>• create a new model to add and subtract up to three-digit numbers utilizing 'regrouping' strategy.<br><br>Objective 2<br>• concepts: count<br>• memorize addition math facts with sums of 18.<br>• memorize subtraction math facts with subtrahend 1 to 18.<br><br>Objective 3<br>• use concrete materials, tables, calculators and number lines.<br>• explain the special role of zero in addition and subtraction<br>• look for patterns in addition and subtraction to solve problems (use addition and subtraction strategies such as doubles, doubles plus or minus one, counting on, counting back and number families to add and subtract single digit numbers,add and subtract up to three-digit numbers with no regrouping, add and subtract up to two-digit numbers with regrouping, explain the special role of zero in addition and subtraction<br>• use patterns to discover the commutative property in addition |

FIGURE 2

| Visual Code | Auditory Code | Associational Code |
|---|---|---|
| *Know Addition and Subtraction Facts* | *Add and subtract whole numbers* | *Utilize the commutative & associative* |
| • concepts: count<br><br>• memorize addition math facts with sums of 18.<br><br>• memorize subtraction math facts with subtrahend 1 to 18 | • put together groups that show fewer objects or more objects than those in a given group<br><br>• put two simple sets together to produce a new set, the sum of which is less than 19, and identify if the new set is more or less than the original set<br><br>• remove a specified quantity from a given set to produce a new set, the subtrahend of which is less than 19, and identify if the new set is more or less than the original set<br><br>• use addition strategies such as doubles, doubles plus one, counting on, and number families to add single digit numbers<br><br>• apply the concept of zero in addition and subtraction<br><br>• add and subtract up to two-digit numbers utilizing ' no regrouping' strategy<br><br>• use addition and subtraction strategies such as doubles, doubles plus or minus one, counting on, counting back and number families to add and subtract single digit numbers<br><br>• add and subtract up to three-digit numbers utilizing 'no regrouping' strategy.<br><br>• Create a new model to add and subtract up to three-digit numbers utilizing 'regrouping' strategy. | • Use concrete materials, tables, calculators and number lines.<br><br>• explain the special role of zero in addition and subtraction<br><br>• look for patterns in addition and subtraction to solve problems (use addition and subtraction strategies such as doubles, doubles plus or minus one, counting on, counting back and number families to add and subtract single digit numbers, add and subtract up to three-digit numbers with no regrouping, add and subtract up to two-digit numbers with regrouping, explain the special role of zero in addition and subtraction<br><br>• use patterns to discover the commutative property in addition |

FIGURE 4

| Information Processing Stage | Auditory Code |
|---|---|
| Declarative Knowledge<br><br>*Acquisition of facts and conceptual models* | • put together groups that show fewer objects or more objects than those in a given group<br>• put two simple sets together to produce a new set, the sum of which is less than 19, and identify if the new set is more or less than the original set<br>• remove a specified quantity from a given set to produce a new set, the subtrahend of which is less than 19, and identify if the new set is more or less than the original set |
| Procedural Knowledge<br><br>*Acquisition of procedures and skills* | • use addition and subtraction strategies such as doubles, doubles plus one, counting on, counting back, and number families to add single digit numbers<br>• apply the concept of zero in addition and subtraction<br>• add and subtract up to two-digit numbers utilizing 'no regrouping' strategy.<br>• use addition and subtraction strategies such as doubles, doubles plus or minus one, counting on, counting back and number families to add and subtract single digit number<br>• add and subtract up to three-digit numbers utilizing 'no regrouping' strategy. |
| Contextual Knowledge<br><br>*Acquisition of new ideas and strategies* | • create a new model to add and subtract up to three-digit numbers utilizing 'regrouping' strategy. |

FIGURE 5

| Information Processing Stage Class | Cognitive Processing Category | | |
|---|---|---|---|
| | Visual Code | Auditory Code | Associational Code |
| Declarative Knowledge<br><br>*Acquisition of facts & conceptual models* | concepts: count<br><br>memorize addition math facts with sums to 18.<br><br>Memorize subtraction math facts with subtrahend 0 to 18. | put together groups that show fewer objects or more objects than those in a given group<br><br>put two simple sets together to produce a new set, the sum of which is less than 19, and identify if the new set is more or less than the original set<br><br>remove a specified quantity from a given set to produce a new set, the subtrahend of which is less than 19, and identify if the new set is more or less than the original set | use concrete material, tables, calculators, and number lines.<br><br>explain the special role of zero in addition and subtraction. |
| Procedural Knowledge<br><br>*Acquisition of procedures and skills* | | use addition and subtraction strategies such as doubles, doubles plus one, counting on, counting back, and number families to add single digit numbers<br><br>apply the concept of zero in addition and subtraction<br><br>add and subtract up to two-digit numbers utilizing 'no regrouping' strategy.<br><br>use addition and subtraction strategies such as doubles, doubles plus or minus one, counting on, counting back and number families to add and subtract single digit number<br><br>add and subtract up to three-digit numbers utilizing 'no regrouping' strategy. | look for patterns in addition and subtraction to solve problems (use addition and subtraction strategies such as doubles, doubles plus or minus one, counting on, counting back and number families to add and subtract single digit numbers, add and subtract up to three-digit numbers with no regrouping, add and subtract up to two-digit numbers with regrouping, explain the special role of zero in addition and subtraction |
| Contextual Knowledge<br>*Acquisition of new ideas and strategies* | | create a new model to add and subtract up to three-digit numbers utilizing 'regrouping' strategy. | use patterns to discover the commutative property of addition |

FIGURE 6

| Information Processing Stage | Visual Code | Auditory Code | Associational Code |
|---|---|---|---|
| Declarative Knowledge<br><br>*Acquisition of facts and conceptual models* | concepts: count | put together groups that show fewer objects or more objects than those in a given group | |
| | | | •explain the special role of zero in addition and subtraction |
| | •memorize addition math facts with sums of 18. | •put two simple sets together to produce a new set, the sum of which is less than 19, and identify if the new set is more or less than the original set | •use concrete materials, tables, calculators and number lines. |
| | •memorize subtraction math facts with subtrahend 1 to 18 | •remove a specified quantity from a given set to produce a new set, the subtrahend of which is less than 19, and identify if the new set is more or less than the original set | •use concrete materials, tables, calculators and number lines. |

FIGURE 7

| Information Processing Stage | Visual Code | Auditory Code | Associational Code |
|---|---|---|---|
| Declarative Knowledge<br><br>*Acquisition of facts and conceptual models* | Concepts: count<br>Symbols: numbers 0-18, equals =, plus +, minus - | Put together groups that show fewer objects or more objects than those in a given group | Given a number sentence, use a number line to show fewer or more objects than those specified in a number sentence and write a new number sentence. |
| | Concepts: special role of zero in addition and subtraction (the number stays the same) | Put together groups and add or subtract 0 | Explain the special role of zero in addition and subtraction |
| | Memorize addition math facts with sums of 18. | Put two simple sets together to produce a new set, the sum of which is less than 19, and identify if the new set is more or less than the original set | Given two number sentences in which the addends have been reversed, use a number line to find the sums. |
| | Memorize subtraction math facts with subtrahend 1 to 18 | Remove a specific quantity from a given set to produce a new set, the subtrahend of which is less than 19, and identify the new set is more or less than the original set. | Given a number sentence in which the subtrahend is the same and the minuend is contrived to show the commutative property, use a number line to find the difference. |

FIGURE 8

| Information Processing Stage | Auditory Code | Curriculum Method |
|---|---|---|
| Declarative<br><br>*Acquisition of facts & conceptual models* | put together groups that show fewer objects or more objects than those in a given group<br><br>put together groups and add or subtract 0<br><br>put two simple sets together to produce a new set, the sum of which is less than 19, and identify if the new set is more or less than the original set<br><br>remove a specified quantity from a given set to produce a new set, the subtrahend of which is less than 19, and identify if the new set is more or less than the original set | Tutorial<br><br>Concept Modeling |
| Procedural<br><br>*Acquisition of procedures and skills* | use addition strategies such as doubles, doubles plus one, counting on, and number families to add single digit numbers.<br><br>apply the concept of zero in addition and subtraction.<br><br>use subtraction strategies such as doubles, doubles plus or minus one, counting on, counting back and number families to subtract single digit numbers<br><br>add and subtract up to two-digit numbers with no regrouping.<br><br>add and subtract up to three-digit numbers with no regrouping. | Drill & Practice<br><br>Games<br><br>Simulation |
| Contextual<br><br>*Acquisition of new ideas and strategies* | add and subtract up to two-digit numbers with regrouping | Discovery |

FIGURE 9

SYSTEM AND METHOD OF DEVELOPING A CURRICULUM FOR STIMULATING COGNITIVE PROCESSING

TECHNICAL FIELD OF THE INVENTION

The present invention is directed, in general, to teaching systems and, more specifically, to a system and method of developing a curriculum for stimulating cognitive processing.

BACKGROUND OF THE INVENTION

In the early days of education, Educators assumed that when students first attended school, the students had adequate vision and hearing. Over time this assumption was not necessarily the case. This led to the schools testing the visual and auditory acuity of students so families can be advised if there are impairments that require attention. Education disciplines then assumed that if students had normal visual and auditory acuity it was their responsibility to learn the content provided by their teachers. Again, the assumption was proven to be false.

Research determined that specific levels of sensory-cognitive processing are at least as critical to learning as specific levels of sensory acuity. With the advent of sensory-cognitive measures, educators have the capability to determine if students are processing sensory information consciously enough at the central level to be able to learn, think, and reason. Pribram, in "Brain and perception: Holonomy and structure in figural process," by Pribram (1991), which is hereby incorporated by reference, clarified this cognitive aspect of perception when he observed that individuals cannot think about something of which they are not consciously aware, and cannot be aware of something not perceived sufficiently at the sensory level to come to consciousness.

A human brain can only receive information from the senses. How individuals can react to this information at the central level significantly affects whether the individual can acquire new concepts and learn quickly and easily, at an average rate, or at a reduced rate with difficulty. More specifically, it depends upon the ability of an individual to consciously perceive incoming sensory information and label, classify, organize, and compare it with information from other sensory modalities to help the individual interpret the incoming sensory information. The greater this ability, the faster an individual can acquire new concepts and learn. However, appropriate central processing cannot be assumed. Students will be independent, self-correcting learners to the extent that educators take the responsibility to identify, test for, and facilitate for each student the comparator function and central processing of sensory information so necessary to concept formation. For more background information, see "Sensory-cognitive factors in the controversy over reading instruction," by P. Lindamood, et al., The Journal of Developmental and Learning Disorders, Vol. 1 (No. 1), PP. 143–182, which is hereby incorporated by reference.

Educators have been arguing whether to use decoding, sight word memorizing or language-context methods for teaching an individual to read. Research is revealing the importance of stimulating the sensory-cognitive functions of phonemic awareness and concept imagery if Educators want to prevent reading disorders in the first place, and successfully remediation of children and adults who do not have adequate sensory-cognitive capabilities. Similar debates have and are occurring in other areas of education.

Accordingly, what is needed in the art is a way to develop a curriculum for learning that enables one to stimulate cognitive processing to increase the ability of an individual to consciously perceive incoming sensory information and label, classify, organize, and compare it with information from other sensory modalities.

SUMMARY OF THE INVENTION

To address the above-discussed deficiencies of the prior art, the present invention provides a method and a computer system of developing a curriculum for stimulating cognitive processing, and a curriculum product produced by the process. In one embodiment, the method includes placing at least one goal, objectives and skills for each of the objectives into a list, and assigning the objectives for the at least one goal to cognitive processing categories, the assigning causing the skills to be assigned. The method further includes dividing the skills into information processing stage classes, and arranging the skills initially based upon the information processing stage classes and subsequently upon the cognitive processing categories.

In another embodiment, the present invention provides a computer system for developing a curriculum for stimulating cognitive processing. The computer system includes an objective subsystem configured to obtain at least one goal, objectives and skills for each of the objectives from a user. The computer system further includes a correlation subsystem configured to assign the objectives and the skills for each of the objectives to cognitive processing categories, the correlation subsystem further configured to divide the skills into information processing stage classes. The computer system still further includes a sequencing subsystem configured to sequence the skills initially based upon the information processing stage classes and subsequently upon the cognitive processing categories.

The present invention also provides, in one embodiment, a curriculum product produced by the process that includes: (1) placing at least one goal, objectives and skills for each of the objectives into a list, (2) assigning the objectives for the at least one goal to cognitive processing categories, the assigning causing the skills to be assigned, (3) dividing the skills into information processing stage classes, and (4) arranging the skills initially based upon the information processing stage classes and subsequently upon the cognitive processing categories.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 2 illustrates an exemplary list containing a goal, objectives and skills for each of the objectives constructed in accordance with the principles of the present invention;

FIG. 4 illustrates an exemplary assignment of objectives to cognitive processing categories constructed in accordance with the principles of the present invention;

FIG. 5 illustrates an exemplary division of the skills for the Auditory Code category of FIG. 4 into information processing stage classes constructed in accordance with the principles of the present invention;

FIG. 6 illustrates an exemplary arrangement of skills by information processing stage classes and cognitive processing categories constructed in accordance with the principles of the present invention;

FIG. 7 illustrates an example of declarative knowledge skills arranged in prerequisite order constructed in accordance with the principles of the present invention;

FIG. 8 illustrates an exemplary addition of appropriate skills to the skills of FIG. 7 constructed in accordance with the principles of the present invention;

FIG. 9 illustrates a FIG. 9 for an example of methods of instructions for each of the information processing stage classes for auditory code constructed in accordance with the principles of the present invention;

DETAILED DESCRIPTION

Figure 1:
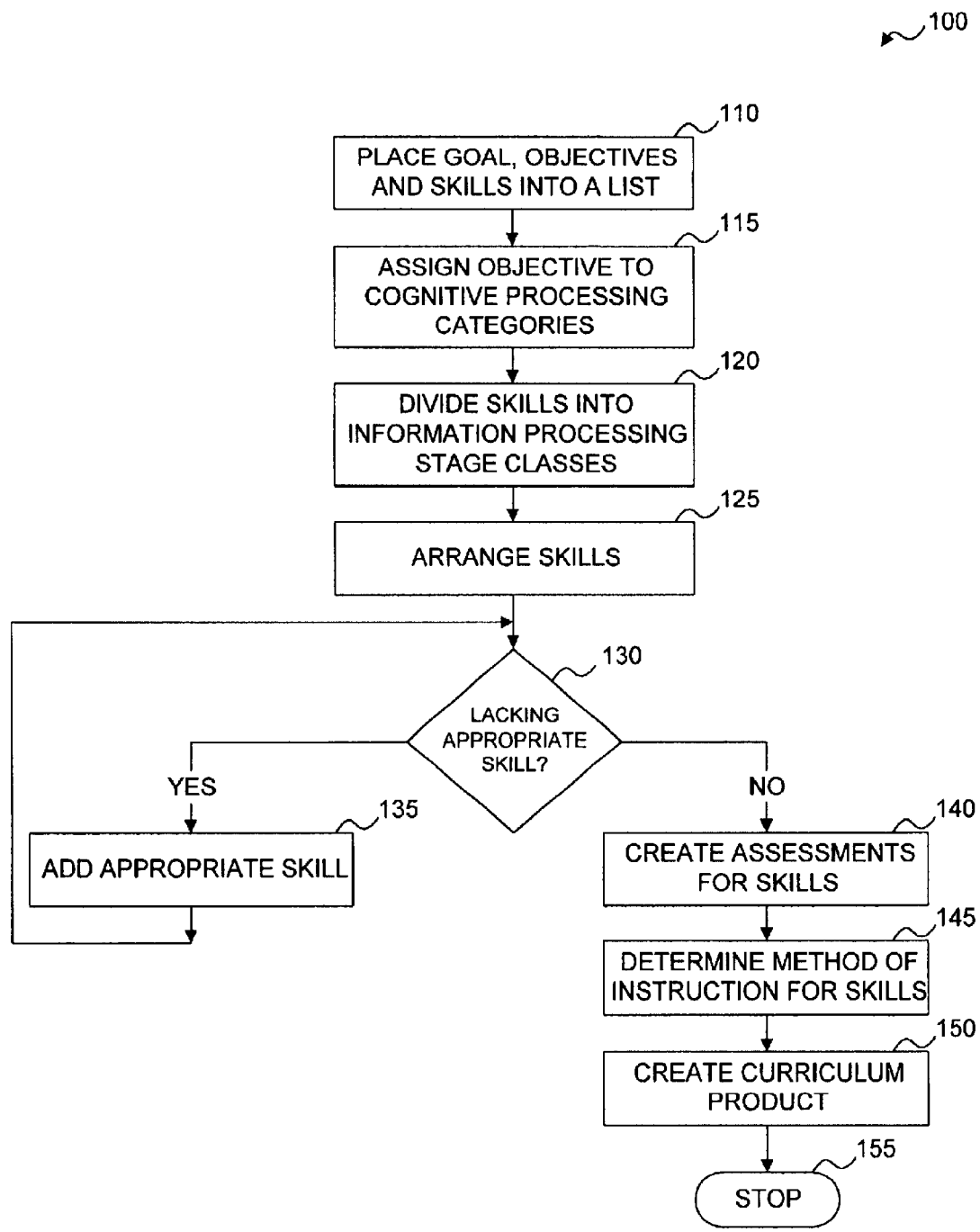
FIG. 1 illustrates a flow diagram of an embodiment of a method of developing a curriculum for stimulating cognitive processing conducted in accordance with the principles of the present invention.

To understand the process of learning, it is important to think of cognitive processes as a complex system, which transforms physical stimuli (sensory input) into psychological thought. The cognitive processing system is based on three main components: structures, functions and behaviors. The structures, functions, and behavior of the cognitive processing system can be illustrated from a neuroscience perspective. Structures are the physical neural networks that provide pathways to the brain and the neural fields that form in the cortices of brain lobes. Functions are the electrical, mechanical and chemical processes that receive sensory input, transport sensory input into specialized locations, and arrange sensory data into schemata. Behaviors integrate the structures and functions into a system that recognizes, organizes and associates stimuli into facts, information and knowledge. This system is often referred to as the sensory transduction system.

Sensory processes that form structures in the cortices of the brain provide the basic knowledge representations of cognitive processing. These structures are constructed in a physiological process that converts sensory stimulation into sensory information. This information is stored in sensory data fields in the brain lobe. The fact that there is a unique neural pathway and corresponding cortex for each sensory modality suggests that each type of sensory input develops structures in the respective cortices that are unique to the modality. These knowledge representation structures are the first step in learning and store the prerequisite information that an individual must have before higher learning processes can be initiated. These knowledge representation structures are also the storage centers for facts, information and knowledge and are the physical basis of cognitive processing.

Nerve cells are highly specialized to convert energy from light, sound, vision, odor and movement into neural signals that convey information about the stimulus to the brain. Tracing the neural networks that categorize and organize neural stimuli and transport it to structures in the cortices facilitates the understanding of brain function. The type of sensory information being processed defines the pathway that a neuron takes to the brain. However, each pathway has similar locations that perform comparable information processing functions. Each pathway begins with receptors that receive sensory input and a mechanism for changing the stimulation into mechanical, electrical or chemical signals. These sensory signals (sensory codes) are transported to anatomical sites where information is channeled into tracts that classify the stimulus by characteristic or origin. Finally, the signals reach a specific cortex where information is classified and integrated in preparation for higher level processing. The result of these initial steps is the brain's ability to perceive information from the environment and represents the model for information processing stage classes. However, this is only part of a larger complex system for learning.

Understanding how the brain functions can be better understood by examining the behaviors that enable cortical associations to be formed in the brain. Cortices of the brain contain organized knowledge representation structures that classify neurons by specific attributes. The association cortices are responsible for the wide range of neural functions and behavioral responses. The association cortices receive and integrate information from a variety of sources and project output to cortical and subcortical areas of the brain. The fact that there is a unique map for each sensory modality suggests that the brain develops diagrams that record and prescribe neural functioning for specific associations. These maps are fundamental to the process of learning and represent the individual's ability to associate and access information. The brain cortices use the maps to form neural networks that associate knowledge representation structures to sensory, motor and associational cortical fields for high level processing. This behavior that integrates neurological structures and psychological functions enables cognitive processing and learning. This represents the model for sensory cognitive processing categories. However, this model alone does not solve the issues related to the larger complex system for learning.

The present invention sets forth that all cognitive processes imitate this basic system of cognitive processing. For example, an input signal is transformed by a physical operation into a new signal. In each content area, humans have used this process to develop systems such as language, science and mathematics for communication and operational purposes. Each content area constructed by man is based on a contrived set of structures (symbols), functions (procedures) and behaviors (associations). This type of learning does not represent innate learning since the symbols, procedures and associations are not developed in response to the environment for survival. However, there is a one-to-one correspondence between learning content area information and innate learning processes. To fully understand this process, the innate learning process should be examined and compared to the process of learning content knowledge.

As discussed previously, one main component in the cycle of learning involves processing sensory input to construct basic structures that represent knowledge. Sensory stimulations shape the knowledge structures in a child's brain. Synaptic connections are elicited in response to sensory stimulation and cognitive structures are formed. The cognitive structures are sensory fields that have categorized facts, information and knowledge. These knowledge representation structures are the basis of neural networks that process information and the structures are typically referred to as the representation of facts, concepts, proposition or principles. These structures have two important characteristics: (1) they are categorized by domain or content area, and (2) can be explicitly remembered and reproduced.

There are four lobes of the brain responsible for processing sensory stimuli: parietal, temporal, occipital and frontal. Each lobe has a corresponding cortex that receives sensory stimulus from peripheral sense organs. Each has a specific function in processing information during the act of learning. The visual cortex, located in the occipital lobe, is responsible for identifying visual stimuli from the retina. The visual cortex is necessary to develop symbolic imagery and encode visual information. The auditory cortex, located in the temporal lobe, is responsible for receiving auditory stimuli from the cochlea. The auditory cortex is involved in processing sound frequencies and sequences to develop the sounds, syllables and words of language. The somatic sensory cortex, located in the parietal lobe of the brain, is concerned with processing sensory information from the body surface. The somatic sensory cortex is involved in processing tactile information and understanding spatial relationships. The motor cortex, located in the frontal lobe of the brain, is not a sensory processing cortex and is responsible for the initiation and termination of voluntary movements. The motor cortex is the cortex that initiates speech, writing, etc. There are also associational cortices in each lobe of the brain that correlate information from the sensory and motor cortices. These cortices are very important in the processing of sensory input between cortices. Table 1.1 illustrates the lobes of the brain and their specific functions.

TABLE 1.1

| Occipital Lobe Visual Cortex | Temporal Lobe Auditory Cortex | Parietal Lobe Somatic Sensory Cortex | Frontal Lobe Motor Cortex |
|---|---|---|---|
| Recognition of visual stimuli organized by specific attribute | Recognition of sounds organized by specific attribute | Recognition of tactile stimuli organized by specific attribute | Recognition of motor stimuli organized by specific attribute |

Content area goals can be broken into objectives from each of these sensory categories. However, each content are may use sensory information from specific cortices. For example, the act of reading requires knowledge representation structures in the visual, auditory and somatic sensory cortices of the brain. Symbol and sight work recognition rely on processing involving ocular structures, phonics and decoding rely on processing involving auditory structures, and structural and contextual analysis rely on processing involving somatic sensory structures. The learner's inability to form structures in any of the cortices decreases learning in that content area.

All cognitive systems use these same basic principles that the sensory transduction system employs to produce psychological thought. To illustrate this process, the sensory transduction of specific sensory modalities can be analyzed. The function of the sensory transduction system can be represented by a three-step process. The first step of the process involves converting physical stimulus to electrical signal. Nerve cells are highly specialized to convert energy from light, sound, vision, odor and movement into neural signals that convey information about the stimulus to the brain. Each sensory modality has a specific method of sensory transduction. For example, the sense of touch is translated into information that the nervous system can process by a chemical process initiated when a stimulus deforms a nerve ending. However, a mechanical process initiated when sound waves "push" on the auditory membrane transforms auditory stimulus. This basic step is complete when the stimulus has been received and transduced into a form that the brain can process.

The second step of the process involves transporting the electrical signal (stimuli) to the corresponding appropriate lobe of the brain. The type of sensory information being processed defines the pathway that a neuron takes to the brain. These pathways are similar for each sensory modality. In the final step of the process, signals reach a specific cortex where information is classified and integrated in preparation for higher level processing. At this point, neurons are sorted and positioned by specialized attributes. It is this process that determines the structure of each knowledge representation. This step arranges the neurons in position for the next cycle of learning.

Each type of sensory stimulus completes the same function described above by traveling from a receptor, to an integrative site in the spinal cord or brainstem, and finally, to the sensory cortices. An example of this is the visual sensory system. When tracing the processing of cells in the ocular pathway, it is evident that visual signals are received in the retina and follow the optic nerve into the optic tract. In the Medial Geniculate Complex, the signals are classified into parallel layers by their ability to recognize motion or color. This parallel processing continues in the visual cortex where the same neurons are integrated into ocular dominance and orientation columns that allow perception. Each step in the process builds on the preceding stage in meeting a desired goal. At some point in the journey from periphery to cortex, each neural system develops an orderly map of receptive fields and corresponding cortical fields. These maps are essential to the functioning of the brain since they outline a sequence of events or tasks that unique signals must follow in order to be associated appropriately. Table 1.2 illustrates the function of the sensory transduction system in three sensory modalities.

TABLE 1.2

| | Visual System | Auditory System | Somatic Sensory System |
|---|---|---|---|
| Receive Information | Retina | Outer ear - (pinna & concha) Middle Ear | Dorsal root ganglion |
| Mediate, | Lateral | Cochlear Nucleus - | Dorsal column |

TABLE 1.2-continued

| | Visual System | Auditory System | Somatic Sensory System |
|---|---|---|---|
| Organize and Relay Information | geniculate nucleus | sound localization Auditory thalamus: Medial geniculate complex | nuclei (gracile & cuneate nuclei) Ventral posterior thalamus (reach thalamus through internal arcuate tract and medial lemniscus) |
| Process Information | Striate cortex Recognition of visual stimuli organized by specific attribute Association Cortices | Auditory Cortex Recognition of sounds organized by specific attribute Association Cortices | Somatic Sensory Cortex Recognition of tactile stimuli organized by specific attribute Association Cortices |

It is the behavior of the neurons in locating appropriate targets and forming associations that produces neural networks of thinking. A knowledge representation in one lobe of the brain does not work independently in producing thoughts. The information in a single lobe is associated with information in the other lobes to enable sensory cognitive processing at each stage of learning. It is this associative capability that allows humans to apply information to process concepts, information and knowledge. In addition, the ability to associate enables low level processing such as common sense and general knowledge of the world, task completion activities, and high level processing such as problem solving and creative thinking. Each of these processes involves activating a subsystem of learning that is a replica of the larger system.

Building neural networks that apply and associate information from the existing knowledge structures is the desired behavior for neurons involved in cognitive processing. To build neural networks, the brain must translate the identified knowledge representations into useful principles, procedures, and strategies from each associated cortex. Just as the individual develops mental maps for each of the sensory modalities, they also develop mental maps of thinking. As the learner grows, developmental experiences are translated into distinct patterns of neuronal activity that are displayed on these maps and influence the function and connectivity of the relevant neurons. Correlated patterns of activity in afferent axons tend to stabilize connections. When a cycle of learning is complete, the neural network formed by the associations becomes a new knowledge representation structure. This structure is then the basis of more complex neural networks. In this way the cycle of learning is ongoing and the learner continually adds facts, applications, and understandings to their knowledge of the world.

This associational process imitates the process that neurons use in processing sensory information. For example, for a human to perceive an object in motion, the stimulus is received and transformed in the ocular system, and then associates with the parietal and temporal lobes to perceive motion and object recognition properties respectively. Without the associations, the human would see only a flat object. There would be no depth or motion perception. Table 1.3 illustrates three sensory lobes and the cortices that neurons associate with to process sensory information into knowledge representations. The processing of sensory information progresses from left to right in each row of Table 1.3.

TABLE 1.3

| | Occipital Lobe Visual Cortex | Temporal Lobe Auditory Cortex | Parietal Lobe Somatic Sensory Cortex |
|---|---|---|---|
| Receive Information | | | |
| Primary Cortex- Sensory (Knowledge Representations Formed) | Recognition of visual stimuli - Topographical map of retina | Recognition of sounds - Topographical map of cochlea, identify frequency discrimination, sound localization | Recognition of tactile stimuli - Topographical map of somatic sensory system |
| Mediate, Organize and Relay Information | | | |
| Secondary Cortex- (Procedural Steps to associate higher order cortical fields) | Higher order processing of visual images - identifying luminance, spectral differences orientation and motion | Higher order processing of sounds - manipulating sequence, number of sounds | Higher order processing of tactile stimuli - manipulating concrete representations |
| Process Information | | | |
| Association Cortex- (Sensory information that has been associated in context of situation) | Visual imagery - perception of visual images including object recognition and motion | Comprehension - perception of the syntax, semantics of language, attending to complex stimuli in the environment. | Tactile learning and memory - perception of body and its ongoing interaction with environment - planning and matching behavior to present and future demands - identifying the nature of complex stimuli in the environment. |

The result of the sensory transduction process is the brain's ability to perceive information from the environment. The three steps involved in converting physiological stimulus to psychological knowledge representations are the same steps that the learner uses in converting content related information to useful knowledge. For example, reading typically uses cognitive sensory processing in the visual, auditory and somatic sensory cortices. Math typically uses cognitive sensory processing in the visual, auditory and associational cortices.

In one embodiment, the present invention employs an Integrated Processes model to illustrate the process that learners use to cognitively process information in the act of learning. The Integrated Processes model enables a person or computer system to design a curriculum, or a system employing that curriculum, to imitate the cognitive learning cycle through the use of sensory input to access knowledge structures and a sequence of developmental skills and activities to build logical and progressive neural networks. FIGS. 1 through 10 will describe the Integrated Processes model in more detail.

Turning now to FIG. 1, illustrated is a flow diagram of an embodiment of a method of developing a curriculum, generally designated 100, for stimulating cognitive processing conducted in accordance with the principles of the present invention. The present invention may develop a reading curriculum. In another embodiment, the present invention may develop a math curriculum. In yet another embodiment, the present invention may develop a spelling curriculum. Of course, however, the present invention is not limited to the above curriculums. In other embodiments, the present invention may used to develop a curriculum for any type of subject matter.

The method 100 first places at least one goal, objectives and skills for each of the objectives into a list in a step 110. A goal is the concept that the student should comprehend at the conclusion of the learning experience (curriculum). Objectives are the main topics and their relationships that must be understood to master the goal. Objectives are also statements that guide the student's learning and the instructor's teaching. Skills are the subtopics that must be understood to master the objective. Prerequisite skills must also be included in the list to ensure that the student's developmental level is available or represented. FIG. 2 illustrates an exemplary list containing a goal, objectives and skills for each of the objectives constructed in accordance with the principles of the present invention. More specifically, FIG. 2 illustrates an exemplary list for a math curriculum for a specific grade level. The goal illustrated in FIG. 2 is "Students use mathematical operations and relationships among them to understand mathematics." The objectives include: (1) add and subtract whole numbers, (2) know single-digit addition and subtraction facts, and (3) utilize the commutative and associate properties to develop strategies for selecting the appropriate computational and operational method in problem solving. FIG. 2 also includes skills for each of the objectives.

Next, the method 100 assigns the objectives for each goal to cognitive processing categories in a step 115. Once the objectives are assigned to a particular cognitive processing category, then each of the skills associated with that objective are also assigned to the same cognitive processing category. In a related embodiment, assigning the objectives to cognitive processing categories may include determining a type of sensory stimulation required for each of the objectives. The cognitive processing categories may be based on the type of sensory processing. One cognitive processing category may be visual code. For purposes of the present invention, the term "code" is a knowledge representation structure constructed in a sensory cortex of the brain from the organization and classification of sensory input resulting (or derived) from the sensory transduction process. Another cognitive processing category may be auditory code. Yet another cognitive processing category may be somatic sensory code. Still yet another cognitive processing category may be associational code. Cognitive processing categories and sensory stimulation are discussed in more detail in FIG. 3. Also, see FIG. 4 for an exemplary assignment of the objectives and skills.

Figure 3:
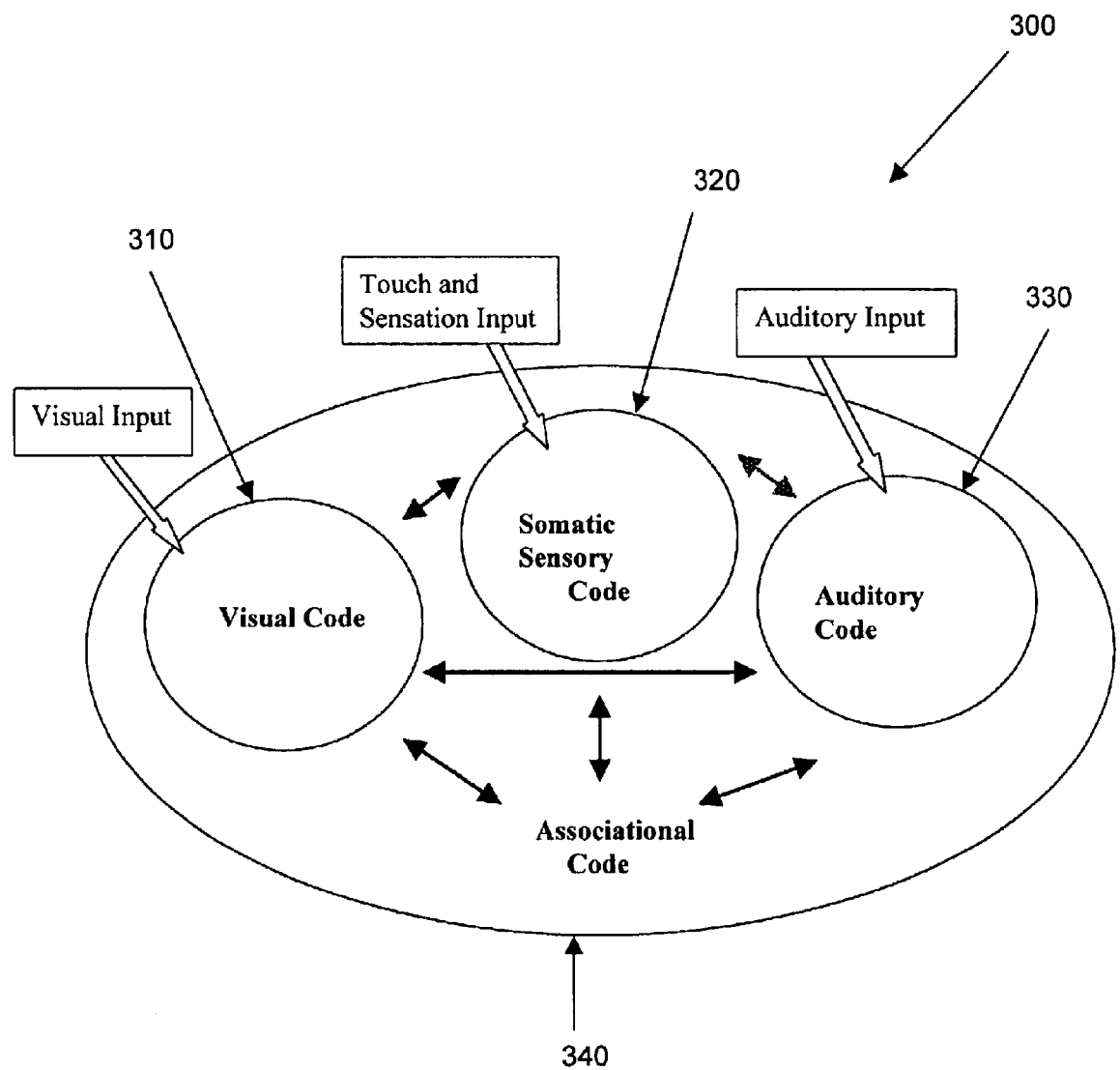
FIG. 3 illustrates an exemplary Venn diagram of cognitive processing categories in relation with sensory stimulus constructed in accordance with the principles of the present invention.

Turning now to FIG. 3, illustrated is an exemplary Venn diagram, generally designated 300, of sensory cognitive processing categories in relation with sensory stimulus constructed in accordance with the principles of the present invention. The Venn diagram 300 also represents the cognitive processing areas of a human brain in relation to each type of sensory stimulus (or sensory input). There are three basic types of sensory inputs: auditory input, visual input and somatic sensory input (or sensations of muscle and skin).

The Venn diagram 300 also illustrates a visual code 310 cognitive processing category. Visual code 310 is the knowledge representation structures formed by visual input. The visual code 310 also represents the striate (visual) cortex in the occipital lobe of the brain. The occipital lobe processes visual input. The occipital lobe is also responsible for organizing visual input and building corresponding knowledge representations. The knowledge representations of the visual code category of cognitive sensory processing are collections of sensory inputs that are categorized by an attribute. The knowledge representations of visual code 310 result in the identification of visual stimulus (discriminations and concrete concepts) that can be retrieved from memory as explicit recall. Explicit recall is a process in which an individual consciously acts to recall or to recognize particular information. In addition, the visual code 310 processes visual input by forming associations with the other sensory code knowledge representation.

Also illustrated in the Venn diagram 300 is somatic sensory code 320 sensory cognitive processing category. The somatic sensory code 320 stores knowledge representations of touch and sensation input. The somatic sensory code 320 also represents the parietal lobe of the brain that organizes somatic sensory input and builds corresponding somatic sensory knowledge representations. The knowledge representations of the somatic sensory code 320 result in the identification of touch and sensation stimulus (discriminations and concrete concepts) that can be retrieved from memory as explicit recall. In addition, the somatic sensory code 320 processes touch and sensation input by forming associations with the other sensory code knowledge representations. Each content area only uses the sensory modalities that are useful to process information needed within that area of knowledge. For example, typical reading curriculums use somatic sensory input and math curriculums typically do not.

The Venn diagram 300 also include an auditory code 330 cognitive processing category. The auditory code 330 is the mental representation of auditory input. The auditory code 330 also represents the temporal lobe of the brain that processes auditory input and builds corresponding auditory knowledge representations. Also, the auditory code 330 stores auditory knowledge representations and once auditory code knowledge representations are produced, they can be accessed from memory as explicit or serial recall. The knowledge representations of auditory code 330 result in the identification of auditory stimulus (discriminations and concrete concepts) that can be retrieved from memory as explicit recall. The knowledge representations of the auditory code 320 also result in the identification of innate verbal commands (rules, principles, and defined concepts) that match classes of relationships to classes of objects and events (visual symbols)and can be recalled from memory as serial recall. Serial recall is a process in which information is processed sequentially. In addition, the auditory code 330 processes auditory input by forming associations with the other sensory code knowledge representations.

In the illustrated embodiment, the Venn diagram 300 also includes an associational code 340. The associational code 340 is the knowledge representation of the meaning or association underlying a particular relationship within and/or between the visual code 310, the somatic sensory code 320, the auditory code 330, and the associational code 340 or a combination thereof. The associational code 340 also represents cortices in each lobe of the brain that processes input from frontal, parietal, occipital and temporal lobes. The associational code 340 processes input by associating sensory code to produce a new code (higher order rules and problem solving rules). Associational codes are accessed front memory as cued recall since they do not form code as the result of direct relationships with the sensory transduction system. In addition, the Associational codes 340 store associated information and represent collections of code that have combined components to form new perceptions, theories, models or concepts.

Today's computer systems can provide the sensory stimulus required to stimulate each lobe of the brain and stimulate cognitive processing (activate learning). For example, to stimulate processing in the occipital lobe (visual code), the graphic user interface of the computer system can be designed to activate processing in the occipital lobe by the use of graphical elements, such as icons, pictures, animations, colors and fonts. To stimulate processing in the parietal lobe (somatic sensory code), user input devices of the computer system can be used, such as a mouse, touch screens, a pen, a digital writing pad and a keyboard. To stimulate processing in the temporal lobe (auditory code), the audio capabilities of the computer system along with or in combination with the other capabilities of the computer system can allow neural processing by producing sound, matching a sound or sounds with visuals, and manipulating the frequency and tones of the audio. Since associational code employ associational cortices in each lobe, to stimulate processing, the computer system can be programmed or configured to or present specified visual and verbal components in a sequential or associative manner to stimulate the creation of desired ideas, models, theories, etc.

In addition, when an objective is selected, the appropriate type of input must be identified and used to activate the learning process. However, each of these objectives must be linked for parallel processing since learning in any content area is the product of varied combinations of visual, somatic sensory, auditory and associational code or knowledge representations. The computer system is capable of automating or being configured to perform this process so that each learner moves progressively through each objective to ensure the content area goal is mastered. For example, math is a combination of math facts (visual code), strategies/procedures/formulas for computation (auditory code), and problem solving abilities in context of real life (associational code). Reading is a combination of sight words (visual code), strategies/procedures for decoding auditory and visual cues (auditory code), and comprehension abilities (somatic sensory code and associational code). If a particular curriculum does not have an objective specified for each type of knowledge representation (sensory cognitive processing categories) that has been specified for that content area, then one or more objectives should be added for those codes or knowledge representations.

Turning now to FIG. 4, illustrated is an exemplary assignment of objectives to cognitive processing categories constructed in accordance with the principles of the present invention. Given the list of objectives and skills illustrated in FIG. 2, the method 100 may examine each objective and determine the appropriate cognitive processing category. In one embodiment, the method 100 may also determine the type of sensory stimulation required for each of the objectives and assign based on the type of sensory stimulation. For example, the first objective listed in FIG. 2 is "Add and subtract whole numbers." This objective is an example of auditory processing (auditory code) since to master this objective the learner must look at visual symbols (numbers) and verbally lead themselves through a known principle (adding and subtracting) to complete the larger task (find the sum). The first objective is therefore assigned to the auditory code sensory cognitive processing category and the skills associated with the first objective are also assigned to the same category.

The second objective listed in FIG. 2 is "Know single-digit addition and subtraction facts." This objective is an example of visual processing (visual code) since to master this objective, the learner must explicitly recall or "know" symbolic mathematical facts. The second objective is therefore assigned to the visual code sensory cognitive processing category and the skills associated with the second objective are also assigned to the same category. The third objective listed in FIG. 2 is "Utilize the commutative and associate properties to develop strategies for selecting the appropriate computational and operational method in problem solving." This objective is an example of associational processing (associational code) since the learner associated visual code about mathematical facts with the auditory code of addition and subtraction principles to create a new framework of understanding (the commutative and associative properties). The third objective is therefore assigned to the associational code sensory cognitive processing category and the skills associated with the third objective are also assigned to the same category. Since the content area of the example is associated with a math curriculum and a math curriculum typically does not include somatic sensory code, the illustrated examples will not involve somatic sensory code. However, the principles of the present invention will apply equally to curriculums that include somatic sensory code or any combination of cognitive processing categories.

Turning back to FIG. 1, after assigning the objectives and skills to the sensory cognitive processing categories in the step 115, the method 100 then divides the skills into information processing stage classes in a step 120. One information processing stage class may be declarative knowledge. Declarative knowledge concerns concrete symbols and objects that produce facts, principles or conceptual frameworks. Skills that are associated with declarative knowledge will relate symbols or concrete images to gain basic knowledge or comprehend basic concepts. Skills that use words such as identify, determine, recognize, classify, and categorize would typically be in declarative knowledge. For example, given the skills categorized under the Auditory Code of FIG. 4, the first three skills would be in declarative knowledge since the learner is dealing with concrete objects (math manipulatives) to determine a principle (less than or greater than). See FIG. 5 for an exemplary division of the skills for the Auditory Code category of FIG. 4 into information processing stage classes constructed in accordance with the principles of the present invention.

Another information processing stage class may be procedural knowledge. Procedural knowledge concerns mental processing skills, strategic knowledge, or operations with knowledge. Skills that are in procedural knowledge have a common characteristic that the learner must implement a set of procedures that can be used on declarative knowledge to develop skill. The learner must apply, analyze or synthesize information to gain this type of knowledge. Procedural knowledge is harder to test than declarative knowledge because it deals with representational procedures instead of observable facts and principles. However, since the operations are carried out within the relevant field of knowledge, the procedures can be demonstrated. Skills that use words such as apply, use, analyze, synthesize, and relate would typically be in procedural knowledge. For example, the fourth through the eighth skills in FIG. 4 would be in procedural knowledge since the learner must apply a strategy (addition strategy, concept of zero, counting on, etc.) to arrive at an outcome. See FIG. 5 for an exemplary division of the fourth through the eighth skills in the Auditory Code category of FIG. 4 into the information processing stage class of procedural knowledge.

Yet another information processing stage class may be contextual knowledge. Contextual knowledge concerns complex, acquired skills that people use to solve problems. Skills that are associated with contextual knowledge will contend with the implementation of evaluation and problem solving abilities as the learner builds theories, models and new perceptions of declarative and procedural knowledge. Skills that use words such as create, evaluate, design, explain and assess would often be in contextual knowledge. For example, the ninth skill in FIG. 4 would be in contextual knowledge since the learner must use regrouping, which involves developing a new model of the problem before solving it. See FIG. 5 for an exemplary division of the ninth skill in the Auditory Code category of FIG. 4 into the information processing stage class of contextual knowledge.

Next, the method 100 arranges the skills initially based upon the information processing stage classes and subsequently upon the cognitive processing categories in a step 125. For example, FIG. 6 illustrates the skills are first arranged by the information processing stage class of declarative knowledge, and second, the skills in declarative knowledge are arranged by cognitive processing categories of visual code, auditory code and associational code. The skills are arranged in the same manner for the other information processing stage classes. As stated previously, somatic sensory code is not illustrated in this example since the illustrated examples concern a math curriculum and a math curriculum typically does not include somatic sensory code. In one embodiment, the method 100 further arranges the skills in prerequisite order. For purposes of the present invention, "prerequisite order" means skills that have one or more prerequisite skills will occur or be placed after those prerequisite skills. The method 100 may arrange the skills in prerequisite order within each cognitive processing categories and across the cognitive processing categories. Illustrated in FIG. 7, is an example of declarative knowledge skills arranged in prerequisite order constructed in accordance with the principles of the present invention. In the illustrated embodiment, the skills and their prerequisite skills are horizontally arranged across each of the cognitive processing categories.

In another embodiment, the method 100 may arrange skills across the information processing stage classes in prerequisite order. For example, a skill in procedural knowledge having a prerequisite skill in declarative knowledge would have to occur or be placed after the skill in the declarative knowledge. In the illustrated embodiment, skills in declarative knowledge will be placed before skills in procedural knowledge, and skills in procedural knowledge will be placed before skills in contextual knowledge. Then, within each information processing stage class, skills in visual code will be placed before skills in auditory code, and skills in auditory code will be placed before skills in associational code.

In contrast, traditional cognitive processing models suggest that a terminal objective must first be identified. Then, the targeted outcome is analyzed to determine its composition. This analysis then leads to the specification of a subordinate set of subtopics, each individual learning act that must be considered prerequisites for the learning. These subtopics in turn are subjected to the same process of analysis. Each subordinate objective is based on the prerequisite skills that the learner must possess to accomplish the task. This set of tasks with corresponding prerequisites becomes a hierarchical taxonomy of learning tasks. This conventional model recognizes the information processing tasks integral to knowledge acquisition.

The Integrated Processes model of the present invention varies from the traditional model because it acknowledges and incorporates the impact of sensory cognitive processes and the knowledge structures that they facilitate on the learning cycle. The Integrated Processes model relates specified brain structures (Visual, Auditory, Somatic Sensory and Associational) with the function of the brain as it processes different types of information (Declarative, Procedural and Contextual). Conventional methods are descriptions of information processing functions and are therefore vertically sequenced. These conventional models do not account for sensory cognitive functions.

In the Integrated Processes model, sensory cognitive processes are seen as an integral part of the learning cycle. The brain receives information from the senses. Researchers have established the fact that individuals cannot learn, think and reason unless they consciously perceive the sensory input at a central level. The individual's ability to label, classify, organize and compare the incoming stimulus with information from other sensory modalities significantly affects their ability to acquire new concepts. In the Integrated Processes model, the sensory cognitive processors (visual, auditory, somatic sensory and associational) build knowledge structures in parallel processing sequences. For instance, a skill in the visual category must have corresponding skills in the auditory and associational stage to complete the learning cycle for the specific skill. In the same way, a skill in the auditory category, would have a prerequisite skill in the visual category. The skill would also act as the prerequisite for the corresponding skill in the associational category. Skills progress horizontally through the three types of sensory cognitive processing at each level of information processing (declarative, procedural and contextual) to make the required associations that develop a skill. To complete the learning cycle for the specific skill, all parallel and serial steps must be mastered.

Next, the method 100 determines if a cognitive processing category lacks an appropriate skill in a decisional step 130. For purposes of the present invention, the phrase "a cognitive processing category lacks an appropriate skill" means that a cognitive processing category does not have an appropriate skill for that cognitive processing category when there is a corresponding skill in another cognitive processing category. If a cognitive processing category lacks an appropriate skill, the method 100 then adds an appropriate skill to that cognitive processing category in a step 135. FIG. 8 illustrates an example of the addition of appropriate skills to the skills of FIG. 7 constructed in accordance with the principles of the present invention. The added appropriate skills are bolded. In FIG. 7, the first row contains skills for visual code and auditory code, but no skill in the associational code. As illustrated in FIG. 8, the method 100 added the appropriate skill in associational code based on the cognitive processing category and the corresponding skills in the previous cognitive processing categories (visual code and auditory code). FIG. 8 also illustrates that the proposed skills were not adequate to form the appropriate knowledge representations for the specified objectives.

Turning back to FIG. 1, once the method 100 has added the appropriate skill to the cognitive processing category, the method 100 returns to determine if another cognitive processing category lacks an appropriate skill in the decisional step 130. If there are no more cognitive processing categories lacking appropriate skills, the method 100, in one embodiment, may create assessments for each of the skills based upon the information processing stage classes and the cognitive processing categories in a step 140. Assessments allow a student's knowledge or capability to be determined, which can then be used to determine how best to help that student. Assessments for a skill are based on the sensory cognitive processing and information processing characteristic of the skill. For example, the skill "put two simple sets together to produce a new set, the sum of which is less than 19, and identify if the new set is more or less than the original set" is found in the auditory code category of declarative knowledge (FIG. 8). An appropriate assessment would be to view colored concrete blocks and select a corresponding addition number sentence.

In a related embodiment, the method 100 may also test a student on each of the assessments and determine when the student makes an incorrect response to one of the assessments associated with a particular information processing stage class. Upon detecting an incorrect response, the method 100 would then place the student at a lowest level of prerequisites for the cognitive processing categories associated with the particular information processing stage class. In one embodiment, the lowest level of prerequisites for cognitive processing categories is the first visual skill. For example, the student would progress horizontally through the cognitive processing categories employed in the curriculum (e.g., visual code, auditory code, somatic sensory code and associational code) for each information processing stage classes (e.g., declarative knowledge, procedural knowledge and contextual knowledge). If a student provides an incorrect response for an auditory code assessment for declarative knowledge, the student would be placed at the lowest level prerequisite (or first skill) in visual code. The student is placed at the lowest level of prerequisite because the student is lacking a particular knowledge structure or structures. By starting at the beginning prerequisite, the student builds the requisite knowledge structures to master the skills.

The method 100 may also track responses of the student over time to determine if the student has a learning deficit. More specifically, the method 100 may track and tabulate a student's responses over time to differentiate error concentration in horizontal (cognitive processing) or vertical (information processing) category. Error analysis from this type of concept map can determine a learning deficit. In this situation, the placement of the student in tasks must be altered to provide concentrated practice in the cognitive or processing category indicated by the analysis.

Next, the method 100 may determine the methods of instructions for the skills within the information processing stage classes in a step 145. Because the Integrated Processes model incorporates sensory cognitive processing with information processing, instructional tasks can be developed for each skill to enhance the stimulation of a person's cognitive processes. In addition, the methods of instructions may use the multimedia capabilities of today's computer systems as an integral part of supplying cognitive stimulation to promote learning. For example, the computer systems can use sounds, graphical displays, colors, tactile input and others to supply cognitive stimulation.

In one embodiment of the present invention, the method 100 may use tutorial and concept modeling for methods of instructions for skills in declarative knowledge. For procedural knowledge skills, the method 100 may use drill and practice, games and simulation as methods of instructions.

For contextual knowledge, the method 100 may use discovery methods of instructions. See FIG. 9 for an example of methods of instructions for each of the information processing stage classes for auditory code constructed in accordance with the principles of the present invention. Of course, however, the present invention is not limited to the types of methods of instructions listed above. In other embodiments, the present invention may use additional or different types of methods of instructions for each of the skills.

Figure 10A:
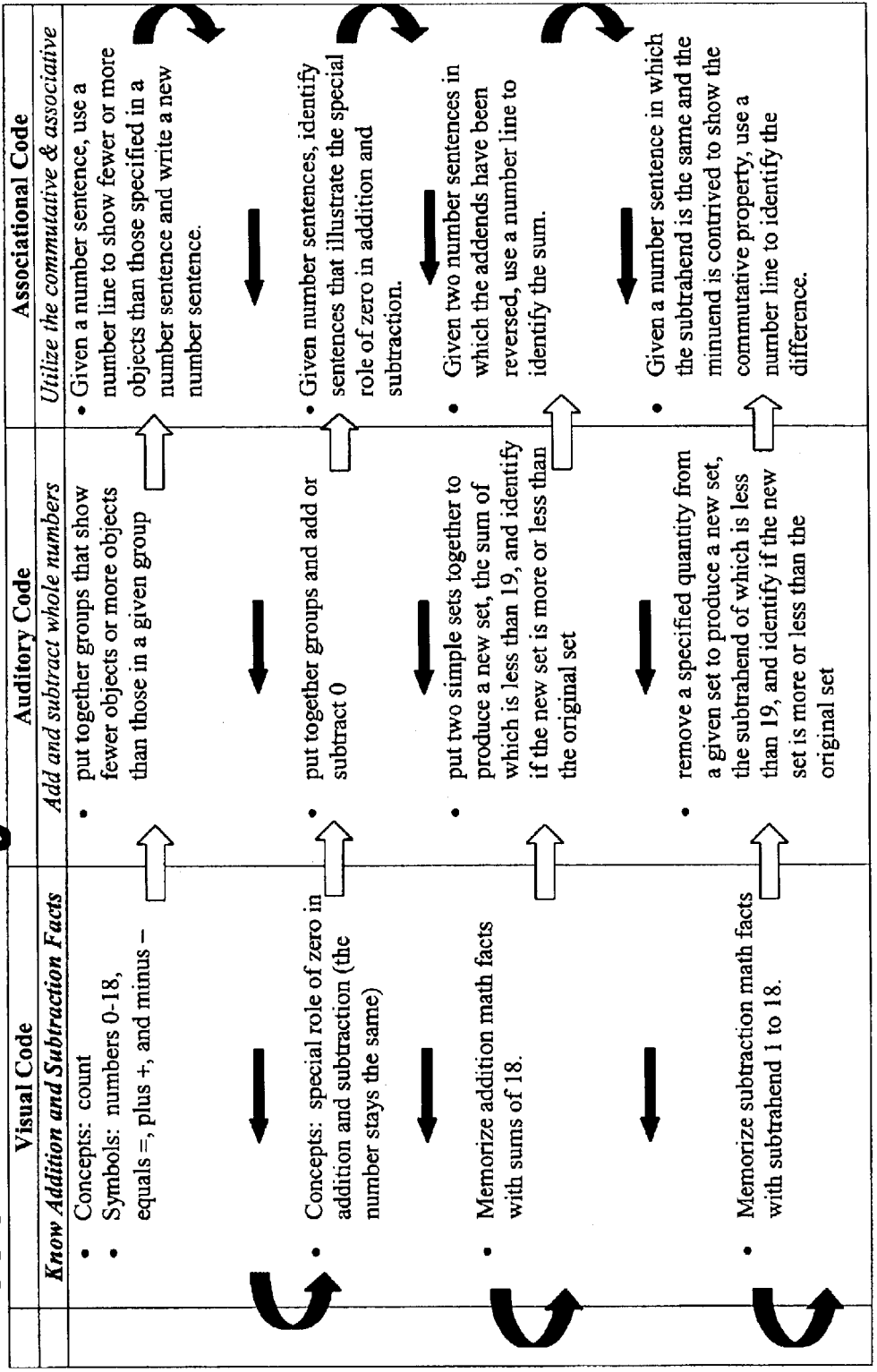
FIGS. 10A–C illustrate an exemplary story board constructed in accordance with the principles of the present invention.
Figure 10B:
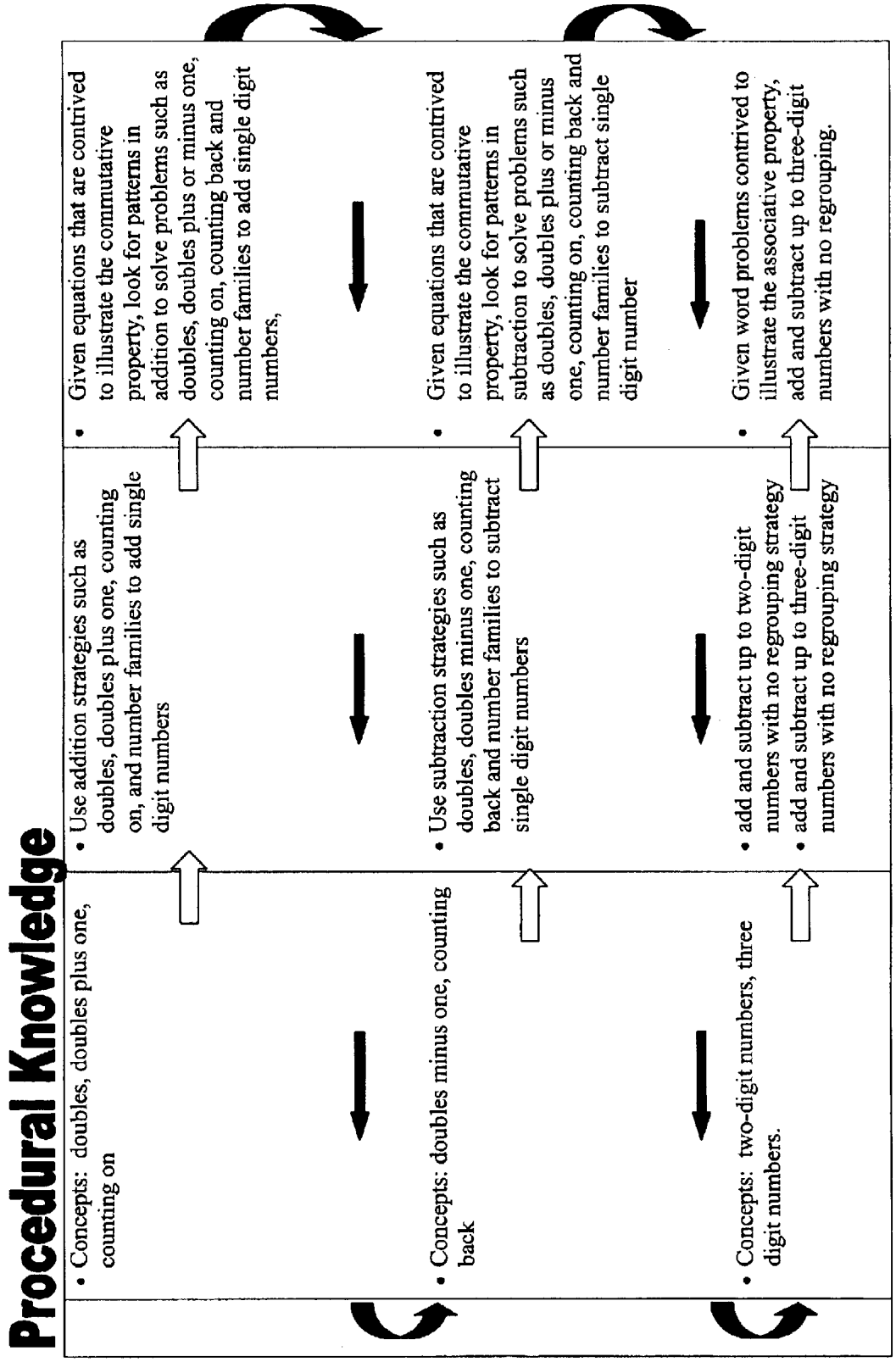
Figure 10C:
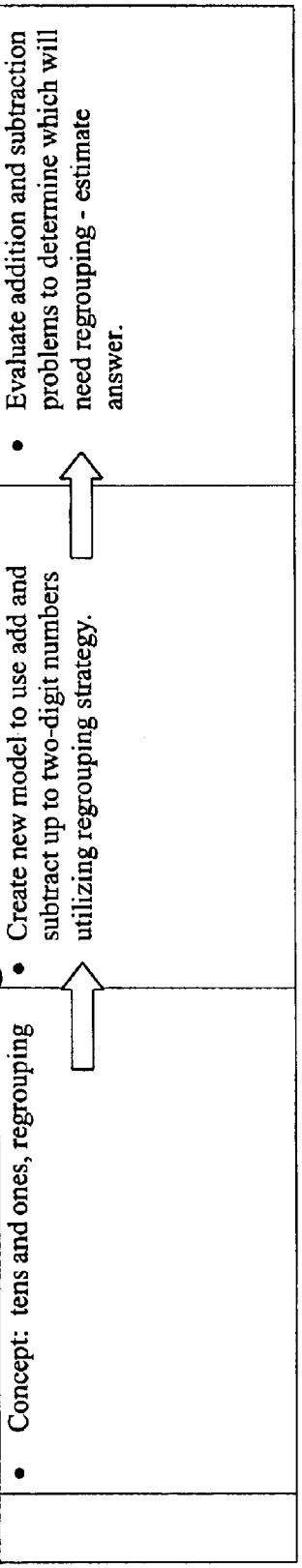

The method 100 may then create a curriculum product in a step 150. A curriculum product may be a story board or a detailed listing of the curriculum. The curriculum product may also be a software program configured to carry out, teach or implement the curriculum employing the skills and their associated methods of instructions. Also, the curriculum product may be data for use in a computer system to enable or configure the computer system to test/teach a student according to the curriculum. In addition, the curriculum product may be information, data, software or a combination thereof that can be distributed via a network, wireless network or the Internet. See FIGS. 10A through 10C for an exemplary story board constructed in accordance with the principles. of the present invention. FIGS. 10A–C also illustrate the sequence in which the curriculum to be used in order to stimulate cognitive processing. A student or teacher would progress through each of the skills horizontally through visual code, auditory code and associational code for all skills in declarative knowledge (one row of skills at a time). Next, the skills in procedural knowledge are processed horizontally. Then, the skills in the contextual knowledge are processed horizontally.

Next, the method 100 then stops in a step 155. One skilled in the art should know that the present invention is not limited to the goals, objectives, skills and methods of instructions described above. Other embodiments of the present invention may use different goals, objectives and skills. Also, other embodiments of the present invention may have additional or fewer steps than described above.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

Figure 11:
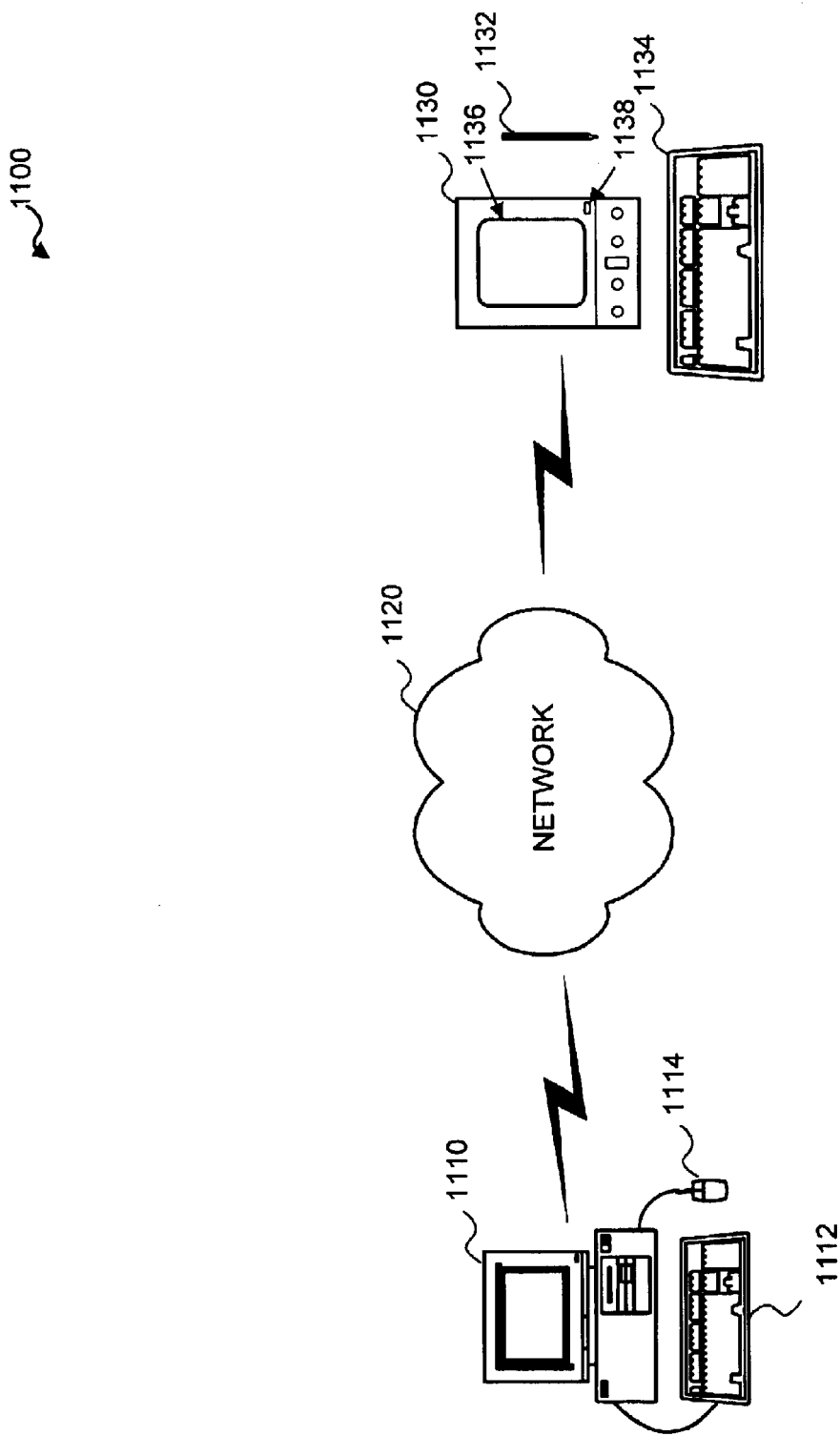
FIG. 11 illustrates a curriculum system for stimulating cognitive processing constructed in accordance with the principles of the present invention.

Turning now to FIG. 11, illustrated is a curriculum system, generally designated 1100, for stimulating cognitive processing constructed in accordance with the principles of the present invention. The curriculum system 1100 may include a development computer system 1110 to develop a curriculum or a curriculum product for stimulating cognitive processing. The curriculum may be a reading curriculum. In another embodiment, the curriculum may be a math curriculum. In yet another embodiment the curriculum may be a spelling curriculum. Of course, however, the present invention is not limited to the curriculums listed above. In other embodiments, the curriculum may be any type of curriculum for teaching a specific topic or subject matter.

As described previously, the curriculum product may be a story board or a detailed listing of the curriculum. The curriculum product may also be a software program configured to carry out, teach or implement the curriculum employing the skills and their associated methods of instructions. Also, the curriculum product may be data for use in a computer system to enable or configure the computer system to test/teach a student according to the curriculum. In addition, the curriculum product may be information, data, software or a combination thereof that can be distributed via a network, wireless network or the Internet. See FIGS. 10A through 10C for an exemplary story board constructed in accordance with the principles of the present invention.

The development computer system 1110 may be software, hardware, firmware or a combination thereof and be embodied within a conventional personal computer (PC), portable data assistant (PDA) or their equivalents. The development computer system 1110 may also include a keyboard 1112 and a pointing device 1114, such as a conventional mouse. Also, the development computer system 1110 may be capable of performing the curriculum or employing the curriculum product to teach one or more people. In addition, the development computer system 1110 may be coupleable to a network 1120. The network 1120 may be a local area network, a wide area network, the Internet or a combination thereof. The development computer system 1110 may employ the network 1120 to send or distribute a curriculum product to one or more computer systems, such as a testing system 1130. See FIG. 12 for an embodiment of a computer system for developing a curriculum for stimulating cognitive processing.

In the illustrated embodiment, the testing system 1130 may be a PDA. In other embodiments, the testing system 1130 may be a PC, a game system or an embedded processing system. The testing system 1130 may be capable of receiving a curriculum product over the network 1120. In another embodiment, the testing system 1130 may be specifically programmed or employ one or more loadable cartridges containing the curriculum or curriculum product. Also, the testing system 1130 may perform specific skills, sequence of skills/drills, tests, assessments, and other types of instructions specified by the curriculum or curriculum product. See FIGS. 13A–E for exemplary sequence of drills that may be employed by the testing system 1130.

The testing system 1130 may also employ a pen 1132 and a keyboard 1134 as part of the curriculum for stimulating sensory inputs of a user. Also, the testing system 1130 may employ a color screen 1136 and a speaker 1138 for stimulating sensory inputs of a user. In addition, the testing system 1130 may employ other capabilities specific to that particular type of computer system. One skilled in the art should know that the present invention is not limited to only the two computer systems illustrated in FIG. 11. Other embodiments of the present invention may employ any number of development computer systems 1110 and testing systems 1130. In yet another embodiment, the present invention may be embodied or employable on a single conventional computer system.

Figure 12:
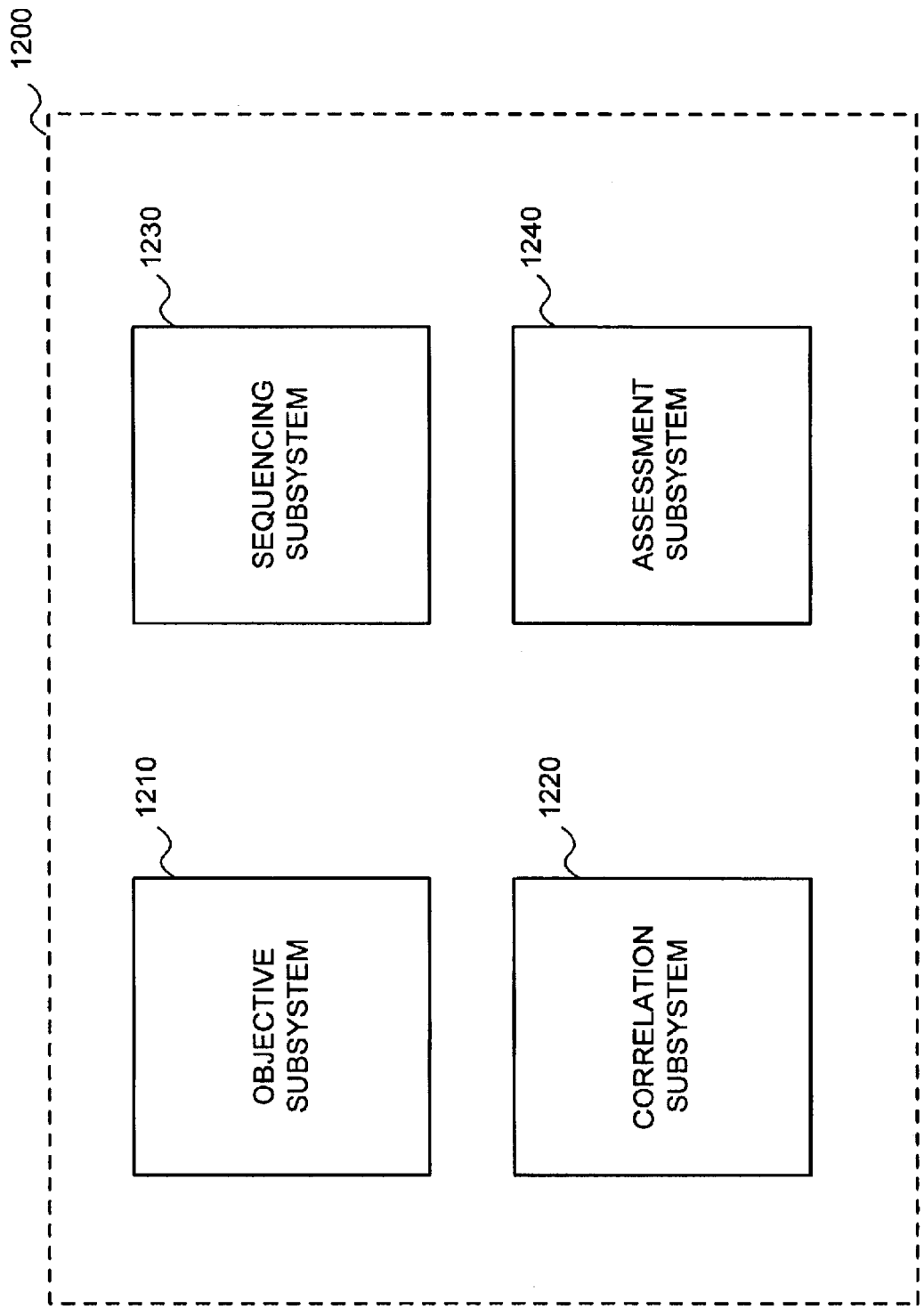
FIG. 12 illustrates an embodiment of a computer system for developing a curriculum for stimulating cognitive processing constructed in accordance with the principles of the present invention.

Turning now to FIG. 12, illustrated is an embodiment of a computer system, generally designated 1200, for developing a curriculum for stimulating cognitive processing constructed in accordance with the principles of the present invention. The computer system 1200 may also produce at least one curriculum product. The computer system 1200 may be software, hardware, firmware or a combination thereof and may be embodied within a conventional personal computer system. In one embodiment, the computer system 1200 may be part of an artificial intelligence system. In another embodiment, the computer system 1200 may be the development computer system 1110 of FIG. 11.

The computer system 1200 includes an objective subsystem 1210 that is configured to obtain at least one goal, objectives and skills for each of the objectives from a user.

The objective subsystem 1210 may be further configured to employ an operator entry system, such as a display, keyboard and mouse, to obtain the goals, objectives and skills. In another embodiment, the objective subsystem 1210 may be further configured to obtain prerequisites for each of the skills. The prerequisites may be obtained from a user, from a predetermined list, or from a knowledge based system (not shown). One skilled in the art is familiar with a knowledge base and artificial intelligence systems.

The computer system 1200 also includes a correlation subsystem 1220. The correlation subsystem 1220 is configured to assign the objectives and the skills for each of the objectives to cognitive processing categories. In a related embodiments the correlation subsystem 1220 is further configured to determine a type of sensory stimulation required for each of the objectives and assign the objectives bases upon the type of sensory stimulation. One type of sensory stimulation is visual code. Another type of sensory stimulation is auditory code. Yet another type of sensory stimulation is somatic sensory code. Still yet another type of sensory stimulation is associational code. The correlation subsystem 1220, in one embodiment, may be configured to employ artificial intelligence to determine the type of sensory stimulation required for each of the objectives and assign the objective to the cognitive processing categories. In another embodiment, the correlation subsystem 1220 may be configured to obtain the type of sensory stimulation required for each objective from a user of the computer system 1200. See FIGS. 2 and 3 for a discussion on sensory stimulation in relation to objectives.

The correlation subsystem 1220 is further configured to divide the skills into information processing stage classes. One information processing stage class may be declarative knowledge. Another information processing stage class may be procedural knowledge. Yet another information processing stage class may be contextual knowledge. In a related embodiment, the correlation subsystem 1220 is further configured to divide the skills into information processing stage classes based on key words used to define the skills. The correlation subsystem 1220, in another embodiment, may be further configured to employ artificial intelligence or a knowledge base to divide the skills based on key words used to define the skills. Skills in declarative knowledge may include key words such as identify, determine, recognize, classify, and categorize. Skills in procedural knowledge may include key words such as apply, use, analyze, synthesize, and relate. Skills in contextual knowledge may include key words such as create, evaluate, design, explain and assess. See FIGS. 1, 4 and 5 for a more detailed discussion on information processing stage classes.

Also included in the illustrated embodiment of the computer system 1200 is a sequencing subsystem 1230. The sequencing subsystem is configured to sequence the skills initially based upon the information processing stage classes and subsequently upon the cognitive processing categories. For example, the skills may be first arranged (sequenced) by the information processing stage class of declarative knowledge, and second, the skills in declarative knowledge are arranged by cognitive processing categories of visual code, auditory code, somatic sensory code (if present) and associational code. The skills are arranged in the same manner for the other information processing stage classes. See FIG. 6 and corresponding sections of FIG. 1 for an example of sequencing skills. In a related embodiment, the sequencing subsystem 1230 may be further configured to sequence the skills in prerequisite order. See FIG. 7 for an example of skills sequenced in prerequisite order.

The sequencing subsystem 1230, in one embodiment, is further configured to determine if at least one cognitive processing category lacks an appropriate skill. The sequencing subsystem 1230 is also configured to obtain and add appropriate skills in those cognitive processing categories. The sequencing subsystem 1230 may be configured to obtain the appropriate skills from a user, a list, a knowledge base or a combination thereof. See FIG. 8 and corresponding sections of FIG. 1 for an example of the addition of appropriate skills. In a related embodiment, the sequencing subsystem 1230 is also configured to assign methods of instruction for the skills within the information processing stage classes. The methods of instruction for declarative knowledge may include tutorial and concept modeling. The methods of instruction for procedural knowledge may include drill and practice, games and simulation. The methods of instruction for contextual knowledge may include discovery. See FIG. 9 and FIGS. 13A–E for examples of methods of instruction.

In the illustrated embodiment, the computer system 1200 may include an assessment subsystem 1240 that is configured to create assessments for each of the skills based upon the information processing stage classes and the cognitive processing categories. In a related embodiment, the assessment subsystem 1240 may be further configured to employ artificial intelligence in creating assessments. In another embodiment, the assessment subsystem 1240 may be configured to obtain the assessments from a user or a user selection from a predetermined list. The assessments may include types of tests to employ, programs, software routines, or a combination thereof. The assessment subsystem 1240, in another embodiment, may be further configured to test a student on each of the assessments and determine when a student makes an incorrect response to one of the assessments associated with a particular one of the information processing stage classes. Upon determining an incorrect response, the assessment subsystem 1240 is also configured to generate a placement that indicates a lowest level or prerequisites for the cognitive processing categories associated with that particular one of the information processing stage classes.

Of course, however, the present invention is not limited to the specific subsystems described above. The grouping of the functions, procedures and/or capabilities described for each subsystem are not limitations of the present invention. In other embodiments of the present invention, the different subsystems may be combined together in different combinations and still be within the scope of the present invention.

Figure 13C:
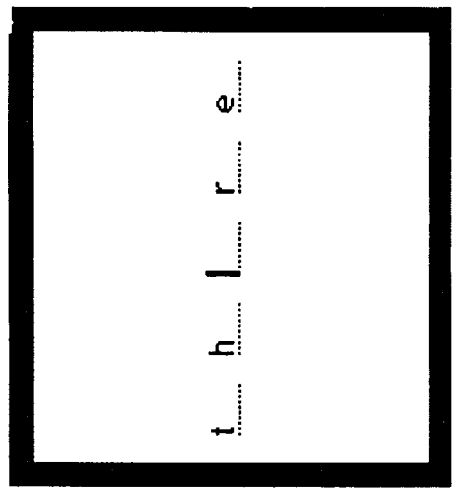
FIGS. 13A–E illustrate exemplary sequence of drills employable by a computer system for conducting a curriculum constructed in accordance with the principles of the present invention.
Figure 13B:
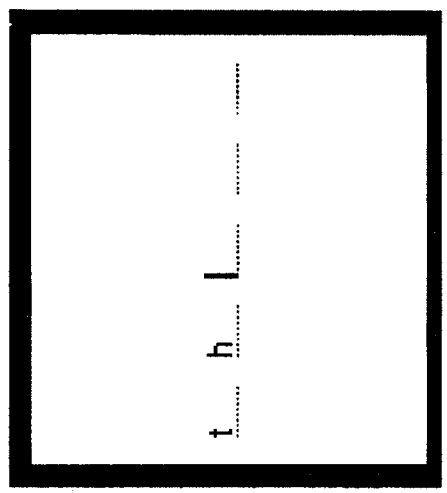
Figure 13A:
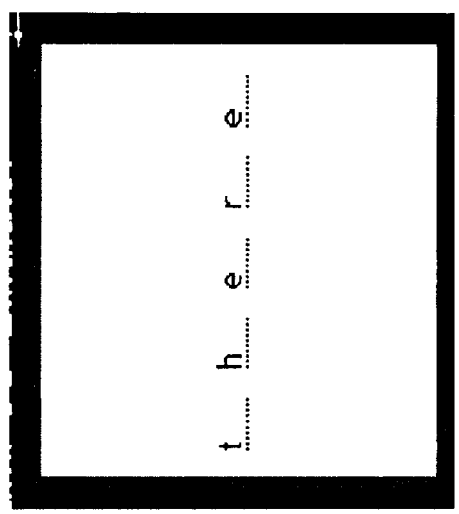

Turning now to FIGS. 13A–E, illustrated are exemplary sequence of drills employable by a computer system for conducting a curriculum constructed in accordance with the principles of the present invention. FIGS. 13A–E are examples of sequence of drills for a spelling curriculum. In FIG. 13A, a word is presented to the user to spell, typically by saying the word, and holders for each of the symbols (or letters) in the word are displayed. A user would then enter each letter of the word in the holders provided.

In FIG. 13B, a word is presented to the user and letter holders for each of the letters in the word are displayed. A user would then enter each letter of the word in sequence. In FIG. 13C, a word is presented to the user and letter holders for each of the letters in the word are displayed with one letter missing. The user enters the missing letter. The letter disappears and another letter holder is specified to be filled in by the user. This repeats until each letter holder has been specified.

Figure 13E:
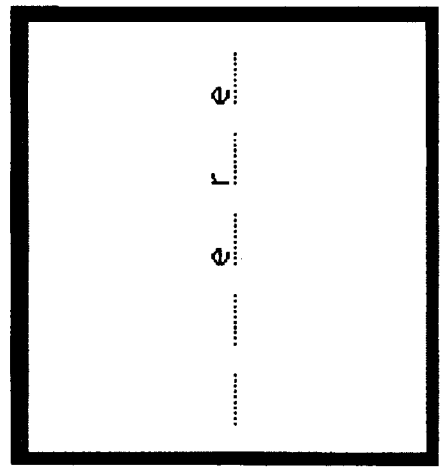
Figure 13D:
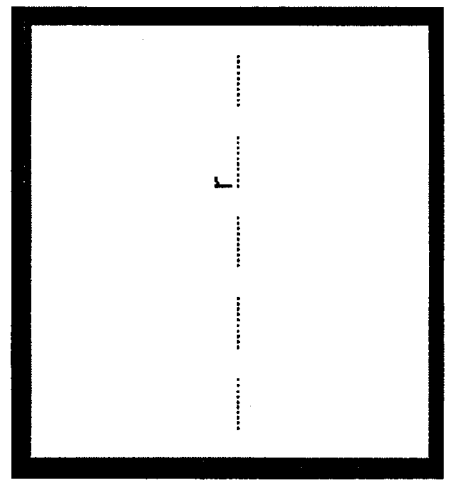

In FIG. 13D, a word is presented to the user and letter holders are displayed to match the number of letters in the word. One random letter holder is specified to be filled in and the user enters the letter. The letter is removed after input and another letter holder is specified to be filled in. In FIG. 13E, a word is presented to the user and letter holders are displayed to match the number of letters in the word. One random letter holder is specified to be filled in by the user and the user enters that letter. The letter is not removed from the display and the process continues until all the letters of the word are entered.

Although the present invention has been described in detail, those skilled in the art should understand that they can make various changes, substitutions and alterations herein without departing from the spirit and scope of the invention in its broadest form.

What is claimed is:

1. A computer readable medium comprising instructions for creating a matrix and corresponding curriculum adapted to stimulate cognitive processing based on sensory cognitive processing categories and information processing stage classes, comprising:

placing at least one goal, objectives and skills for each of said objectives into a list;

assigning said objectives for said at least one goal to said sensory cognitive processing categories, said assigning causing said skills to be assigned;

dividing said skills into information processing stage classes; and arranging said skills based upon said information processing stage classes and said cognitive processing categories.

2. The computer readable medium of claim 1, wherein said matrix and said corresponding curriculum product is adapted to stimulate cognitive processing and information processing in at least one of a following curriculum from a group consisting of:

a reading curriculum;

a math curriculum;

a spelling curriculum; and any content area curriculum.

3. The computer readable medium of claim 1, wherein the placing at least one goal, objective and skill into a list comprises:

identifying a content area of said at least one goal;

identifying said objectives necessary to meet said content area goal; and identifying said skills necessary to meet said objectives.

4. The computer readable medium of claim 1, further comprising determining a type of sensory stimulation required by each of said objectives to construct synaptic connections to build basic structures that represent knowledge.

5. The computer readable medium of claim 4, wherein the assigning of each of said objectives is based on the determining.

6. The computer readable medium of claim 4, further comprising selecting at least one of said cognitive processing categories from a group consisting of:

a visual code representing at least one of the knowledge structures formed by a processing of visual input in an occipital lobe of a brain;

a somatic sensory code representing at least one of the knowledge structures formed by a processing and organization of touch and sensation stimulus in a parietal lobe of the brain;

an auditory code representing at least one of the knowledge structures formed by a processing of auditory input in a temporal lobe of the brain; and an associational code representing at least one of the knowledge structures formed by a meaning or association underlying a particular relationship within and/or between the visual code, the somatic sensory code, the auditory code, and the associational code or a combination thereof formed by a frontal lobe of the brain.

7. The computer readable medium of claim 5, further comprising assigning each of said objectives to the matrix in said sensory cognitive processing categories by determining said type of sensory stimulation.

8. The computer readable medium of claim 1 further comprising:
providing sensory stimulus required to stimulate each lobe of a brain thereby stimulating cognitive processing and activating learning;
stimulating occipital processing by use of graphical elements;
stimulating parietal lobe processing by user input devices;
stimulating temporal lobe processing by audio capabilities; and
stimulating frontal lobe processing to activate associational cortices by presenting specified components in a sequential or associative manner.

9. The computer readable medium of claim 4, wherein the dividing of said skills into information processing stage classes comprises building neural networks that apply and associate information from said basic knowledge structures.

10. The computer readable medium of claim 9, further comprising associating information between said basic knowledge structures in one lobe of a brain with said basic knowledge structures in other lobes of the brain at parallel stages of information processing to allow a human to apply said information to process concepts, information and knowledge, said associating adapted to stimulate correlated networks of neuronal activity.

11. The computer readable medium of claim 10, wherein said associations promote a connection of neurons in afferent axons, said associations building new knowledge representation structures, said knowledge representation structures becoming a basis of new neural networks in a cycle of learning.

12. The computer readable medium of claim 9, further comprising assigning skills to the matrix to build neural networks on the basis of said information processing stage classes.

13. The computer readable medium of claim 12, wherein said information processing stage classes include receiving information, mediating information through organization and relay, and processing information, said stages relating a primary cortice, a secondary cortice and an association cortice of a brain respectively, said cortices corresponding to at least one of said information processing stage classes.

14. The computer readable medium of claim 13, further comprising selecting at least one of said information processing stage classes from a group consisting of:
a formation of a set of basic knowledge representations and concepts, said knowledge representations and concepts formed from declarative processing of concrete symbols and objects that produce facts, principles or conceptual frameworks;
a formation of procedural steps to associate higher order cortical fields, said steps formed from procedural processing concerning mental processing skills, strategic knowledge, or operations with knowledge; and
a formation of information that has been associated in context of a situation, said information formed from contextual processing concerning complex, acquired skills that humans use to solve problems.

15. The computer readable medium of claim 1, wherein the step of arranging said skills ensures skills progress horizontally through sensory cognitive processing categories at each information processing stage class to make required associations that develop a skill.

16. The computer readable medium of claim 15, further comprising arranging said skills vertically in prerequisite order through the information processing stage classes of the matrix and horizontally across the sensory cognitive processing categories.

17. The computer readable medium of claim 15, further comprising adding an appropriate skill to at least one of said sensory cognitive processing categories when said categories lacks said appropriate skill.

18. The computer readable medium of claim 15, further comprising clustering said arranged skills.

19. The computer readable medium of claim 18, further comprising determining movement through each of said clustered skills horizontally across the sensory cognitive processing categories and vertically through the information processing stage classes of the matrix to ensure said content area goal is mastered.

20. The computer readable medium of claim 19, wherein information relating to said arranged skills and said movement on the created matrix is used to determine placement of a student, a created assessment, and an instructional methodology in said corresponding curriculum.

21. The computer readable medium of claim 1, wherein the corresponding curriculum product comprises at least one of a following element from a group including:
the created matrix;
a story board of said goal, objectives and skills from the created matrix;
a detailed listing of said goal objectives and skills from the created matrix;
a software program adapted to administer, teach or implement said at least one said goal objectives and skills from the created matrix; and
a software program adapted to administer, teach, or implement existing content area goals, objectives, and skills from the created matrix.

22. A computer readable medium comprising instructions for creating an assessment of skills for testing a student's knowledge or capability to determine how best to help the student, comprising:
creating an assessment based on an arrangement of skills according to a content area curriculum related to a matrix comprising sensory cognitive processing categories and information processing stage classes;
testing the student on the assessment to determine when the student makes an incorrect response to the assessment associated with at least one of the sensory cognitive processing categories or the information processing stage classes; and
using said tested assessment to place the student at a lowest level of prerequisites for the sensory cognitive processing category associated with the particular information processing stage class.

23. The computer readable medium of claim 22, wherein the creating of an assessment based on the matrix comprises:
obtaining at least one goal, objectives and skills from a content area curriculum;
assigning said objectives for said at least one goal to cognitive processing categories, said assigning causing said skills to be assigned;

dividing said skills into information processing stage classes;

arranging said skills into clusters based upon said information processing stage classes and said cognitive processing categories; and specifying movement through each of said clustered skills horizontally across the sensory cognitive processing categories and vertically through the information processing stage classes of the matrix to ensure said content area goal is mastered, said movement determining order of presentation of assessment items.

24. The computer readable medium of claim 22, wherein the testing comprises:

predicting information processing learning deficit in the student; and predicting sensory processing deficit in the student.

25. The computer readable medium of claim 24, wherein the predicting information processing learning deficit comprises:

tracking and tabulating the student's responses over time to differentiate error concentration in the information processing stage classes on the matrix;

analyzing errors in each of the information processing stage classes to determine learning deficit, said analysis indicating placement of said student in at least one of said information processing stage classes; and after further error analysis, altering said placement in tasks to provide concentrated practice in the at least one of said information processing stage classes.

26. The computer readable medium of claim 24, wherein the predicting sensory processing deficit comprises:

tracking and tabulating the student's responses over time to differentiate error concentration in the sensory cognitive processing categories on the matrix;

analyzing errors in each of the sensory cognitive processing categories to determine learning deficit, said analysis indicating placement of said student in at least one of said sensory cognitive processing categories; and after further analysis, altering said placement in tasks to provide concentrated practice in at least one of said sensory cognitive processing categories.

27. The computer readable medium of claim 22, wherein information relating to at least one of the created assessment and the tested assessment is utilized in a computer system to enable the computer system to test the student and place the student in a location within the matrix.

28. The computer readable medium of claim 22, further comprising creating a curriculum product related to said matrix, said curriculum product comprising:

a storyboard comprising at least one goal, objectives and said skills from the created matrix;

a detailed listing of said at least one goal, objectives and skills from the created matrix;

a software program adapted to administer, teach, or implement corresponding created assessments for said skills from the created matrix; and a software program adapted to administer, teach, or implement corresponding created assessment for said skills from a matrix created from existing content area goals, objectives, and skills.

29. A computer readable medium comprising instructions for determining placement of a student in a content area curriculum related to a matrix, comprising:

obtaining at least one goal, objectives and skills from the content area curriculum;

assigning said objectives for said at least one goal to cognitive processing categories, said assigning causing said skills to be assigned;

dividing said skills into information processing stage classes;

arranging said skills into clusters based upon said information processing stage classes and said cognitive processing categories; and determining movement through each of said clustered skills horizontally across the sensory cognitive processing categories vertically through the information processing stage classes of the matrix to ensure said content area goal is mastered, said movement used to determine the placement of the student.

30. The computer readable medium of claim 29, further comprising creating a curriculum product related to said matrix, said curriculum product including:

a storyboard of said at least one goal, objectives and skills utilized to determine placement from the created matrix;

a detailed listing of said at least one goal, objectives and skills utilized to determine placement from the created matrix;

a software program adapted to administer, teach, or implement the placement of the student for said at least one goal, objectives and skills from the created matrix; and a software program adapted to administer, teach, or implement the placement of the student for said at least one goal, objectives and skills from a matrix created from existing content area goals, objectives, and skills.

31. A computer readable medium comprising instructions for determining an instructional methodology for skills based on an arrangement of the skills according to a content area curriculum related to a matrix, comprising:

obtaining at least one goal, objectives and said skills from said content area curriculum;

assigning said objectives for said at least one goal to sensory cognitive processing categories, said assigning causing said skills to be assigned;

dividing said skills into information processing stage classes;

arranging said skills based upon said information processing stage classes and said cognitive processing categories;

determining sensory input in said sensory cognitive processing categories based on said assignment of skills; and determining said instructional methodology in said information processing stage classes based on said arrangement of skills, said instructional methodology including:

tutorial and concept modeling as methods of instruction for skills in declarative knowledge;

drill and practice, games, and simulation as methods of instruction in for skills in procedural knowledge; and discovery method for skills in contextual knowledge.

32. The computer readable medium of claim 31, further comprising:

utilizing multimedia capabilities to promote sensory cognitive processing, said capabilities including sound, graphical displays, colors, and tactile input.

33. The computer readable medium of claim 31, further comprising:

utilizing data processing capabilities to promote information processing, said capabilities including:

accessing tutorial and concept modeling methods of instruction to promote skills in declarative knowledge;

accessing drill and practice, games, and simulation methods of instruction to promote skills in procedural knowledge; and accessing discovery methods of instruction to promote skills in contextual knowledge.

34. The computer readable medium of claim 31, further comprising creating a curriculum product related to said matrix, said curriculum product including:

a storyboard of said at least one goal, objectives, and skills related to said instructional methodology from the created matrix;

a detailed listing of said at least one goal, objectives, and skills related to said instructional methodology from the created matrix;

a software program adapted to administer, teach, or implement said instructional methodology for each said skills from the created matrix; and a software program adapted to administer, teach, or implement said instructional methodology for each said skills from a matrix created from existing content area goals, objectives, and skills.

* * * * *